(12) United States Patent
Brown, Jr.

(10) Patent No.: US 7,694,673 B2
(45) Date of Patent: Apr. 13, 2010

(54) COMBINATION HEAT RECOVERY—SOLAR COLLECTOR

(76) Inventor: Joseph Francis Brown, Jr., 11 Rose La., Cherry Hill, NJ (US) 08002

( * ) Notice: Subject to any disclaimer, the term of this patent is extended or adjusted under 35 U.S.C. 154(b) by 32 days.

(21) Appl. No.: 11/607,572

(22) Filed: Dec. 4, 2006

(65) Prior Publication Data

US 2007/0137641 A1      Jun. 21, 2007

(51) Int. Cl.
*F24J 2/04* (2006.01)
(52) U.S. Cl. .................. 126/640; 126/592; 126/683; 126/685; 126/698; 62/235; 62/235.1
(58) Field of Classification Search ............. 126/400, 126/569, 534, 640, 587, 636, 592, 714, 685, 126/683, 698; 62/235, 235.1
See application file for complete search history.

(56) References Cited

U.S. PATENT DOCUMENTS

| 3,935,897 | A | * | 2/1976 | Pulver | 165/49 |
| 4,043,315 | A | * | 8/1977 | Cooper | 126/591 |
| 4,190,199 | A | * | 2/1980 | Cawley et al. | 126/586 |
| 4,211,207 | A | * | 7/1980 | Molivadas | 126/587 |
| 4,235,678 | A | * | 11/1980 | McKeen | 202/185.1 |
| 4,254,822 | A | * | 3/1981 | Geier | 165/48.2 |
| 4,256,090 | A | * | 3/1981 | Imperiale | 126/590 |
| 4,265,223 | A | * | 5/1981 | Miserlis et al. | 126/592 |
| 4,422,434 | A | * | 12/1983 | Statz et al. | 126/634 |
| 4,617,911 | A | * | 10/1986 | Adler | 126/628 |
| 4,660,761 | A | * | 4/1987 | Bussjager | 237/2 B |
| 4,834,285 | A | * | 5/1989 | Besik | 237/48 |
| 5,123,247 | A | * | 6/1992 | Nelson | 60/641.8 |
| 5,150,253 | A | * | 9/1992 | Watanuki | 359/360 |
| 6,511,022 | B1 | * | 1/2003 | Robinson | 244/158.3 |
| 6,708,687 | B2 | * | 3/2004 | Blackmon et al. | 126/680 |
| 6,820,420 | B2 | * | 11/2004 | Hebert | 60/641.7 |
| 2002/0129811 | A1 | * | 9/2002 | Hebert | 126/714 |
| 2006/0059911 | A1 | * | 3/2006 | Shichman | 60/641.2 |

FOREIGN PATENT DOCUMENTS

JP          06185825 A    *   7/1994

* cited by examiner

*Primary Examiner*—Steven B McAllister
*Assistant Examiner*—Avinash Savani

(57) ABSTRACT

This invention absorbs available heat from the flue gas of an existing building's heating system and heat from the sun. The heat is absorbed and stored in a heat-collecting sphere of special design. The absorbed heat collected in the sphere is transferred, by the conventional refrigeration cycle, to the heat exchanger located at the air inlet to the building heating system. The refrigerant liquid is sprayed into the collecting sphere, as it absorbs heat, it evaporates and changes into a gas. The refrigerant compressor transfers the gas from the heat-collector to the heat exchanger. The existing heater fan draws air across the heat exchanger finned coil removing heat from the refrigerant. The refrigerant gas gives up heat and is condensed. The heated air combines with the existing furnace air to heat the existing building. The refrigerant liquid from the heat exchanger is transferred to the heat-collecting sphere spray nozzles.

4 Claims, 3 Drawing Sheets

FIG.-3
HEAT RECOVERY – SOLAR COLLECTOR DETAILS
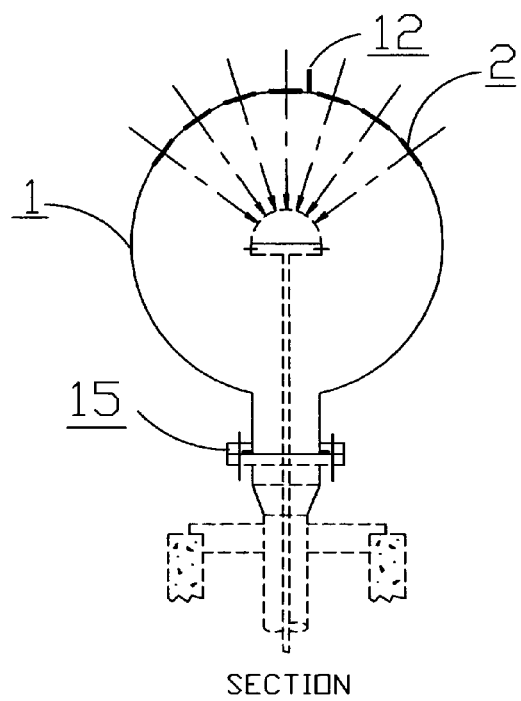
SECTION
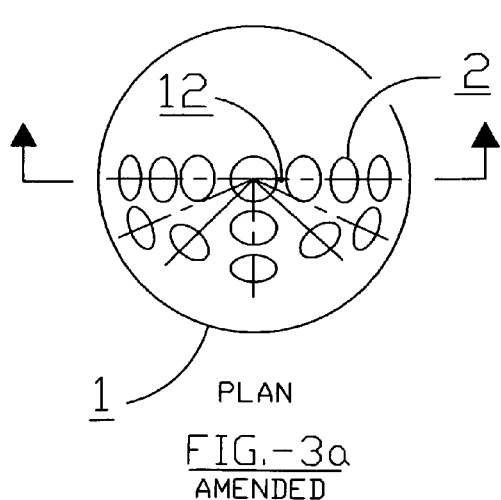
PLAN
FIG.-3a
AMENDED
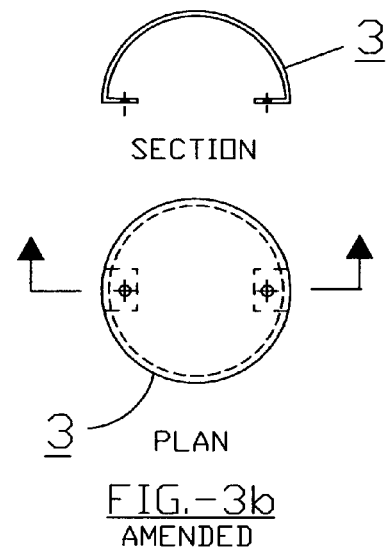
FIG.-3b
AMENDED
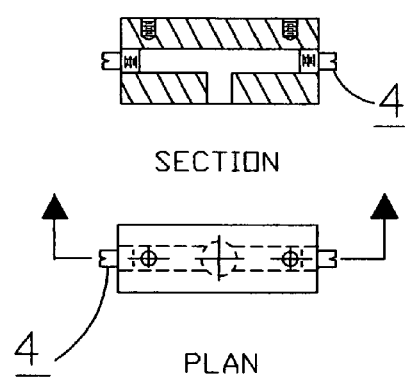
FIG.-3c
AMENDED

COMBINATION HEAT RECOVERY—SOLAR COLLECTOR

The average building heating system is very inefficient. An amazing amount of heat escapes up through the chimney. This invention recovers much of the escaping heat and delivers it to the building's existing heating system. The conventional refrigeration system is used to collect and transfer the recovered heat. This system is not self-sufficient but is a supplement to the existing building heating system. This invention also captures the heat energy from the sun. The heat is recovered and stored in the heat-collecting sphere. The refrigerant compressor transfers the heat from the heat-collecting sphere to the heat exchanger. The heat-collecting sphere is located just above the chimney top and the heat exchanger is located at the air entrance to the existing heater. The existing heater fan, when actuated by an existing thermostat, delivers the collected heat into the building's primary heating system.

The designations (1) thru (18) specify system components which are shown in the detailed description and the following drawings.

Figure 1:
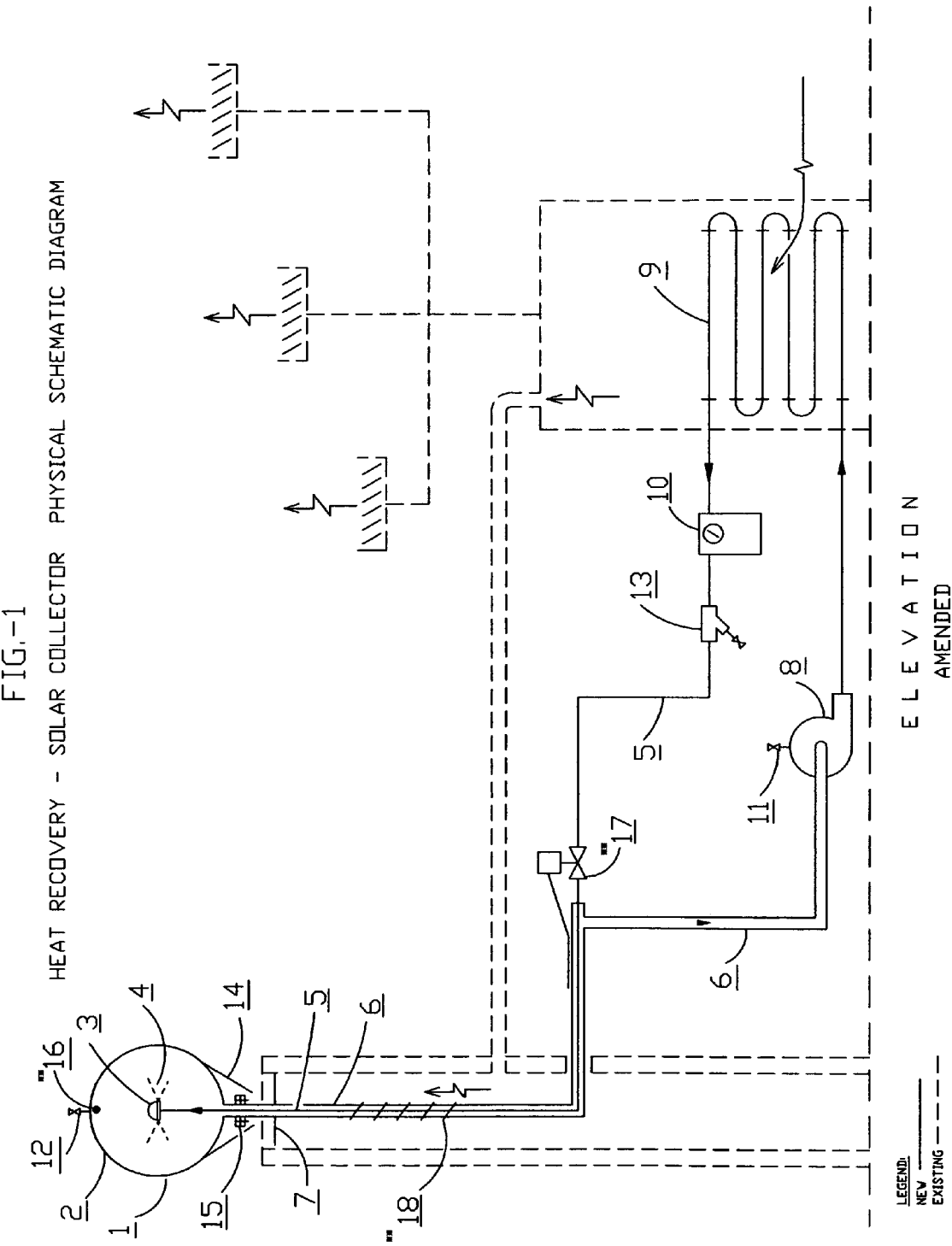

FIG. 1 Heat Recovery-Solar Collector Physical Schematic

Figure 2:
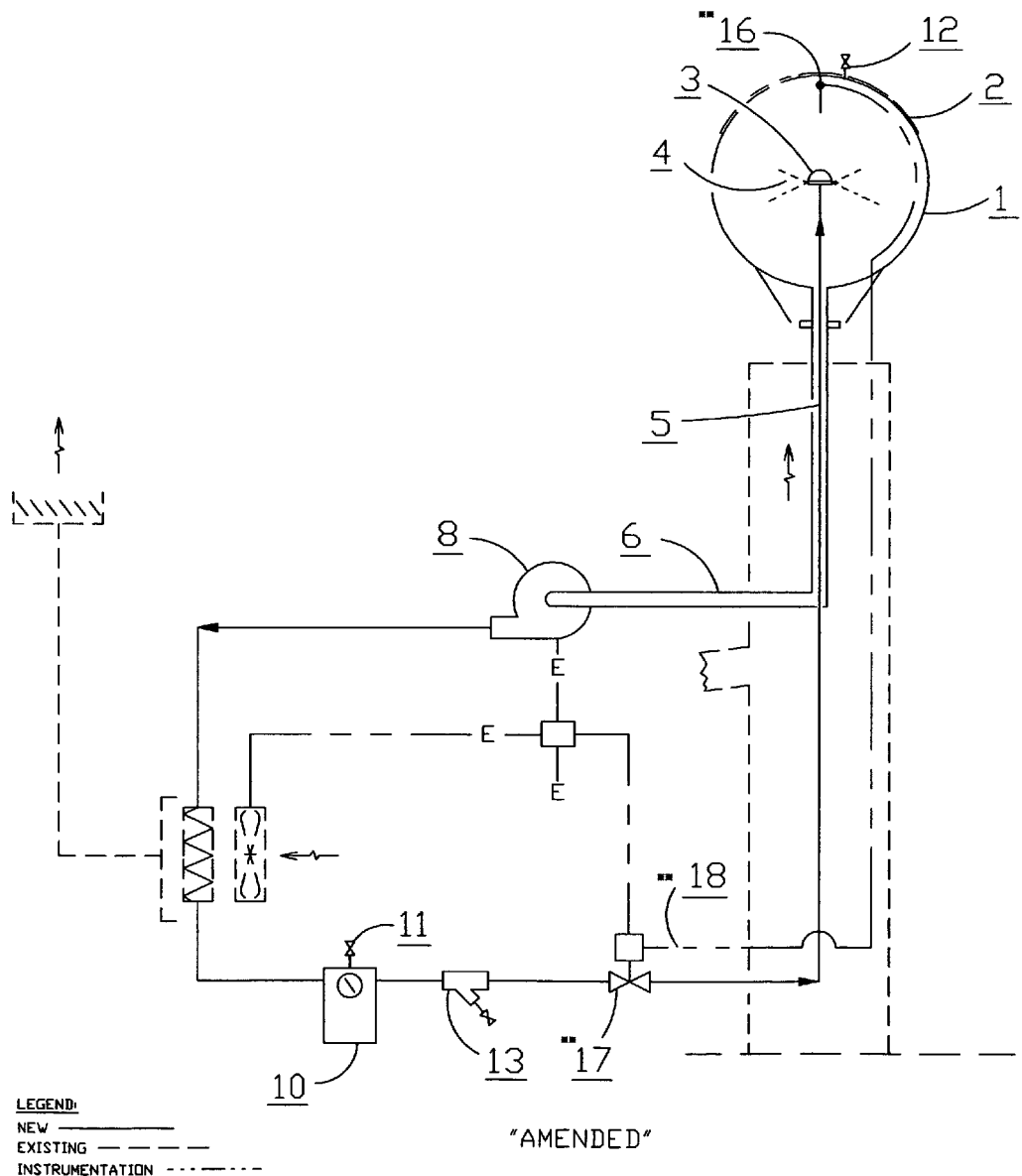

FIG. 2 Heat Recovery-Solar Collector Schematic Diagram.

FIG. 3 Heat Recovery-Solar Collector Details

BACKGROUND OF THE INVENTION

The rising energy costs and the inefficiency of the present home heating system, inspired this invention. The flue gas escaping up thru the chimney from an existing heating system, contains much heat which is discharged into the atmosphere and wasted. The sun's rays contain available heat energy. This invention captures the available flue gas and sun heat and transfers it to the existing heating system, improving heater efficiency and reducing consumer utility costs.

BRIEF SUMMARY OF THE INVENTION

This invention uses a refrigerant to absorb and transfer heat to an existing building heating system. The heat is absorbed from the existing chimney flue gas and from the sunrays. The heat collected is transferred to the existing heater air entrance. The major components of the heat absorbing and heat transfer system are, an evaporator, a condenser and a refrigerant compressor. The evaporator is a heat-collecting sphere which absorbs and stores heat. The very fine spray from the spray nozzles, located inside the heat-collecting sphere, allows quick and complete heat absorption. The refrigerant sprayed into the sphere absorbs heat and changes to a gas. The refrigerant gas is transferred to the condenser, the heat exchanger, at the air entrance to the existing furnace. The collected heat is transferred to the existing heating system by the heat exchanger. The system is not self-sufficient but compliments the existing heating system. It uses the existing heater fan to transfer the collected heat to the building heating system. The heat of compression from the compressor, also adds heat to the heating system. The refrigerant compressor delivers hot gas from the sphere to the heat exchanger. When heat is given up to the heater air inlet the refrigerant gas is condensed. The refrigerant liquid flows thru the liquid supply line to the spray nozzles.

DETAILED DESCRIPTION OF INVENTION (1) Heat collecting sphere is a reservoir for the combination heat recovery-solar collecting system. The sphere is structurally, aerodynamically and surface configured for optimum design. The components are of copper and or aluminum because of their high heat transfer properties. Material components for larger units may differ because of construction and economic factors. The bottom of the heat-collecting sphere is placed at a distance above the chimney top to heat the under surface of the sphere and allow flue gases to easily escape. The lamp black color of the outer surface of the sphere increases heat absorption from the escaping flue gas and heat energy from the sun. The internal surface of the heat recovery sphere is silver in color, for heat reflection. The magnifiers on the heat collector surface increase the sun's intensity, which increases the internal temperature of the heat-recovery sphere. The flange located at the base of the heat-collecting sphere allows for complete horizontal rotation, needed for proper orientation of the magnifiers relationship to the sun's path.

(2) Solar collector magnifiers are strategically placed on the surface of the sphere for optimum sunray magnification. All magnifier focal points are concentrated onto the outer surface of the heat-absorbing dome, located inside the heat-collecting sphere.

(3) Heat-absorbing dome is centrally located inside the heat-collecting sphere. The outer dome surface is lamp black. The inner surface is silver in color. All magnifier focal points are concentrated onto the outer surface of the heat-absorbing dome. The magnified rays contacting the heat-absorbing dome increases the heat intensity of the sphere and also creates even heat distribution within the heat-collecting sphere.

(4) Liquid spray nozzles are centrally located inside the heat-collecting sphere. The very fine refrigerant liquid spray from the nozzles enters the heat-collecting sphere expanding, lowering the refrigerant boiling point. The spray increases refrigerant surface area and the liquid refrigerant quickly changes to a gas.

(5) Liquid supply line is centrally located inside the hot gas return line and delivers refrigerant liquid to the spray nozzles. The hot gas return line preheats the liquid. The liquid supply line supports the nozzles and heat-absorbing dome.

(6) Hot gas return line is centrally located inside the existing chimney and is connected at one, to the refrigerant compressor and the other, to the heat-collecting sphere. The ring-type flange on the return line allows for support and proper sphere orientation. The refrigerant compressor delivers the refrigerant gas from the heat-collecting sphere to the heat exchanger.

(7) Line support and stabilizers are attached to the hot gas return line located inside the chimney. They extended to the chimney corners for vertical and lateral support of the lines.

(8) Refrigerant compressor delivers the hot gas from the heat-collecting sphere to the furnace heat exchanger. The compressor is connected electrically to the existing heater fan. The existing heater thermostat setting activates the existing fan and the refrigerant compressor.

(9) Heat exchanger is located at the entrance of the existing heater air intake and receives hot gas from the refrigerant compressor. The refrigerant gas, as it gives up heat to the entering heater air, condenses and the liquid is transferred to the receiver.

(10) Liquid receiver is located at the outlet of the heat exchanger and is the liquid refrigerant storage tank. The liquid receiver contains the system pressure gauge. The refrigerant liquid is transferred to the spray nozzles thru the liquid supply line.

(11) Purge & Fill connection is located on the liquid receiver.

(12) Purge & Vent connection is located on the collecting sphere.

(13) Liquid strainer is located on the liquid receiver discharge line and is necessary for the proper functioning of spray nozzles.

(14) Wind baffles are located between the chimney top and sphere to cause an upward wind action to prevent chimney downdraft.

(15) Flange & gasket located between the hot gas return line and the heat collecting sphere allows for, access to the spray nozzles and the proper orientation of the magnifiers.

Fireplace and larger units will require these additional components:

**(16) Temperature sensor is located inside the heat-collecting sphere to measure the internal temperature. The sensor insures that when the sphere's set temperature is reached the refrigerant compressor will start delivering refrigerant gas to the heat exchanger. (Fireplace design will require a fan to deliver the heated air into the room and activated with the compressor)

**(17) Solenoid valve is located in the refrigerant liquid supply line and controls the flow of liquid to the spray nozzles. The set sensor temperature activates the solenoid valve.

**(18) The solenoid valve instrument line is spirally wound around the outside of the hot gas return line. The spirally wrapping increases the heat transfer rate of the flue gas.

The invention claimed is:

1. A system for capturing heat energy from waste gas comprising:
   a chimney flue stack for conveying exhaust gases from a combustion space;
   a solar heat collecting sphere located directly above said chimney flue stack, said solar heat collecting sphere comprising at least one spray nozzle connected to a liquid supply line;
   a heat exchanger;
   a hot gas return line placed inside said chimney flue stack, said hot gas return line coupled to said solar heat collecting sphere and a refrigerant compressor, wherein said refrigerant compressor delivers refrigerant gas from said solar heat collecting sphere to said heat exchanger;
   said liquid supply line centrally located inside said hot gas return line for supplying said refrigerant to said solar heat collecting sphere for conversion to a refrigerant gas;
   a flange located at a base of said solar heat collecting sphere, wherein said flange allows for complete rotation about a vertical axis for maximum solar heat absorption;
   wind baffles located below said solar heat collecting sphere to cause an upward wind action; and
   and air supply for passage through said heat exchanger to heat a desired location.

2. The system for capturing energy from waste gas of claim 1, wherein solar heat collecting sphere further comprises a heat collecting dome having an outer surface coated with lamp black color and an inter surface coated with silver color.

3. The system for capturing energy from waste gas of claim 2, wherein solar heat collecting sphere comprises magnifiers on surface of said sphere to create magnifier focal points onto said outer surface of said heat absorber dome.

4. The system for capturing energy from waste gas of claim 1, wherein said at least one liquid spray nozzle is centrally located inside said solar heat collecting sphere.

\* \* \* \* \*